(12) United States Patent
Helff et al.

(10) Patent No.: US 8,215,261 B2
(45) Date of Patent: Jul. 10, 2012

(54) PROCESS AND APPARATUS FOR INTRODUCING A POTTING COMPOSITION INTO A FILTER APPARATUS

(75) Inventors: Markus Helff, Mannheim (DE); Franz Kugelmann, Bliesen (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 668 days.

(21) Appl. No.: 12/227,012

(22) PCT Filed: Apr. 27, 2007

(86) PCT No.: PCT/EP2007/003766
§ 371 (c)(1),
(2), (4) Date: May 14, 2009

(87) PCT Pub. No.: WO2007/128440
PCT Pub. Date: Nov. 15, 2007

(65) Prior Publication Data
US 2009/0238967 A1 Sep. 24, 2009

(30) Foreign Application Priority Data

May 5, 2006 (DE) .......................... 10 2006 021 066

(51) Int. Cl.
*B05D 7/22* (2006.01)
*B01D 63/02* (2006.01)
*B29C 70/84* (2006.01)
(52) U.S. Cl. ........................................ 118/408; 427/230
(58) Field of Classification Search .......... 427/230–239; 118/55, 407–409
See application file for complete search history.

(56) References Cited

U.S. PATENT DOCUMENTS

| 4,940,541 A | * | 7/1990 | Aoyagi | 210/321.8 |
| 5,075,003 A | * | 12/1991 | Aoyagi | 210/321.8 |
| 2005/0115885 A1 | | 6/2005 | Pope et al. | |

FOREIGN PATENT DOCUMENTS

| DE | 43 15 697 C1 | 7/1994 |
| DE | 101 47 907 A1 | 4/2003 |
| EP | 0 305 687 A1 | 3/1989 |
| EP | 0 521 495 A2 | 1/1993 |
| JP | A-51-103083 | 9/1976 |
| JP | 61 171504 | 8/1986 |
| JP | A-61-187204 | 11/1986 |
| JP | 8 19729 | 1/1996 |
| JP | A-2004-283807 | 10/2004 |
| JP | 2005 118640 A | 5/2005 |
| JP | A-2005-118640 | 5/2005 |
| WO | WO 84/02486 | 7/1984 |
| WO | WO 03/006134 A2 | 1/2003 |
| WO | WO 03/028864 A1 | 4/2003 |

OTHER PUBLICATIONS

International Preliminary Report on Patentability for PCT/EP2007/003766 issued Dec. 10, 2008, 8 pages.*

* cited by examiner

*Primary Examiner* — William Phillip Fletcher, III
(74) *Attorney, Agent, or Firm* — Jacobson Holman PLLC

(57) ABSTRACT

A method and apparatus for introducing a sealing compound into a filter device include attaching sealing caps for the purpose of producing the sealing compound, and distributing the sealing compound from a sealing chamber via the sealing caps onto the ends of the filter device. The sealing compound is passed from the sealing chamber into a rotationally symmetrical cantilevered projection of the respective sealing cap, from which the sealing compound penetrates into the housing via corresponding slots of the sealing cap.

14 Claims, 4 Drawing Sheets

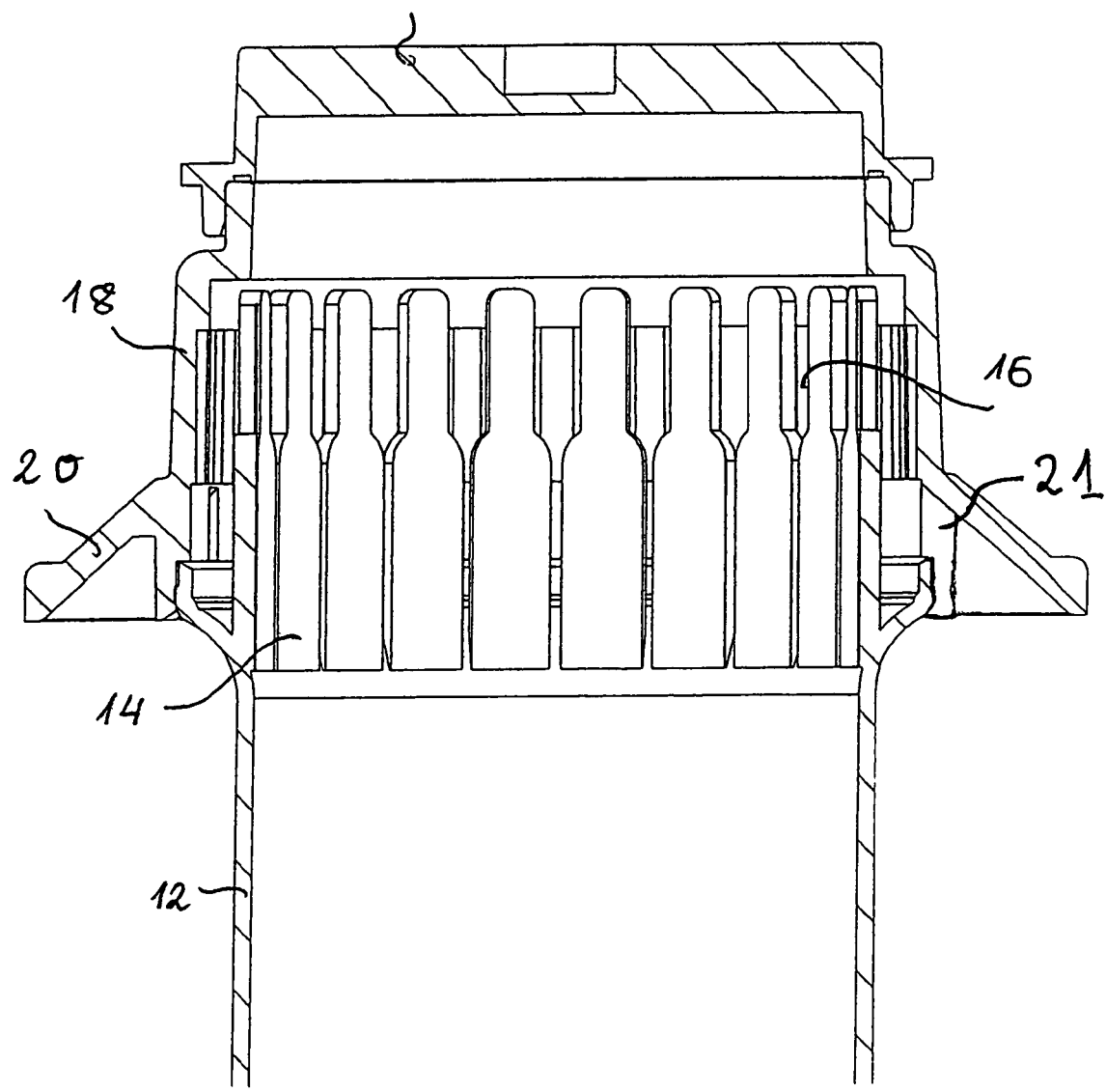

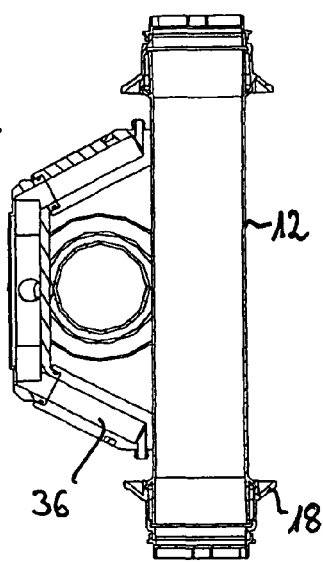
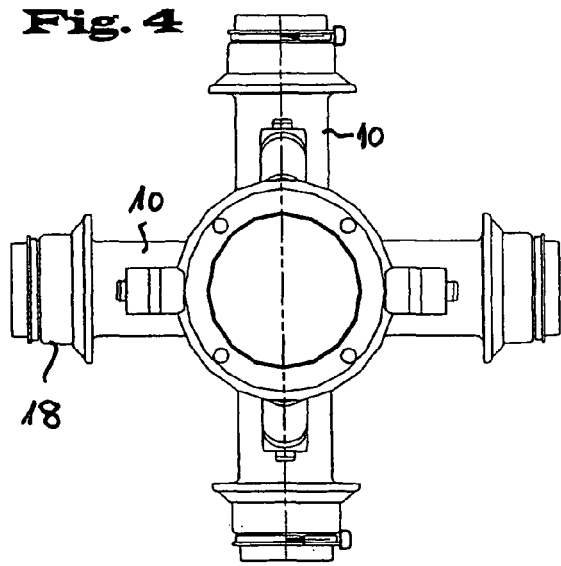
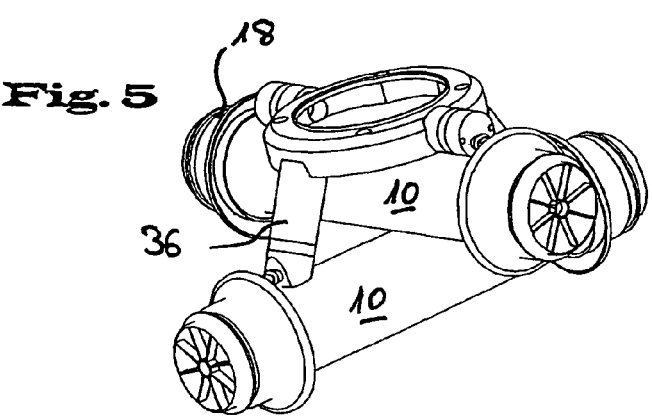

PROCESS AND APPARATUS FOR INTRODUCING A POTTING COMPOSITION INTO A FILTER APPARATUS

CROSS-REFERENCE TO RELATED APPLICATION

This is a national stage of PCT/EP2007/003766 filed Apr. 27, 2007 and published in German, which has a priority of German no. 10 2006 021 066.2 filed May 5, 2006, hereby incorporated by reference.

BACKGROUND OF THE INVENTION

1. Field of Invention

This invention relates to a method and an apparatus for introducing a sealing compound into a filter device, preferably into a dialysis filter.

2. Description of the Prior Art

Filter devices, such as dialysis filters, have two flow spaces, a first space of which is formed by the tubular passages of the fibers of a bundle of hollow fibers and a second space of which is formed by a housing enclosing the bundle of hollow fibers, the end portions of the fibers being encapsulated in a sealing compound upon sealing. For this purpose, the bundle of hollow fibers usually is first inserted into the housing of the dialysis filter, and by means of a suitable method, the ends of the bundles of hollow fibers are encapsulated with the sealing compound.

Such methods for introducing the sealing compound are already known from EP 305 687 A1 and DE 101 47 907 A1. Here, special sealing caps are placed onto the housing of the filter device, through which sealing compound is introduced. These inlets for the sealing compound can be mounted radially or axially. The filter device is rotated, so that inside the filter device the two fluid spaces for blood and dialysate are obtained, which are required for instance for dialysis. After the sealing compound is cured, the sealing cap is withdrawn or cut off and replaced by a cap with corresponding inlets as required for dialysis. In this case, seals are usually required once again, in order to separate the two fluid spaces from each other.

In the method described above and with the apparatus for introducing the sealing compound necessary for performing this method, it is necessary to connect the connections of the housing provided for sealing with the sealing chamber which supplies the sealing compound. As this is a mechanical plug-in connection, connecting housing and sealing chamber with each other involves much effort and can largely be performed only manually. Theoretically, an automation of this connection is possible, but is extremely complex and expensive in technical terms.

From WO 03/006134 A2 a specially designed housing of a filter device is known. This housing has a frame with two inlet holes for the sealing compound, which are located at the respective ends. The sealing compound is applied centrally onto the surface of the housing. During the rotation, the sealing compound is distributed through the holes into the interior of the housing. However, the sealing compound introduced by means of this known method exhibits certain asymmetries. The desired uniform rotational symmetry cannot be achieved by means of this method.

SUMMARY OF THE INVENTION

Therefore, it is the object of the present invention to create a method and an apparatus for introducing a sealing compound into a filter device, which can easily be automated.

In accordance with the invention, this object is solved by a method as described herein. Such a method for introducing a sealing compound into a filter device with two flow spaces, a first space of which is formed by the tubular passages of the fibers of a bundle of hollow fibers and a second space of which is formed by a housing enclosing the bundle of hollow fibers, the end portions of the fibers being encapsulated in a sealing compound upon sealing, consists in that for the purpose of introducing the sealing compound sealing caps are attached and that the sealing compound is distributed from a sealing chamber via the sealing caps onto the ends of the filter device. In accordance with the invention, the sealing compound is introduced from the sealing chamber into a rotationally symmetrical cantilevered projection of the respective sealing cap, from where it advantageously penetrates into the housing via corresponding slots of the sealing cap.

Advantageous aspects of the invention can be taken from the description provided herein.

Accordingly, the sealing chamber and the filter device can be rotated, so that the sealing compound is injected by means of centrifugal forces. The sealing chamber rotates in synchronism with the filter device. Injecting the compound can be effected in a contactless way, i.e. the filter housing and the sealing chamber can be rotated at a distance from each other and be synchronised subsequently, so that the outlet of the sealing chamber is aligned with the circumferential projection of the cap. Then, the sealing compound is injected, which gets into the cap as a result of the centrifugal forces and is distributed therein accordingly. Thereby, it is advantageously achieved that possible tolerances or alignment errors between the rotating centrifuge, in which the filter housings are supported, and the rotating sealing chamber no longer cause any problems. The compensation of tolerances is ensured.

An automation of the sealing process is easily possible. This is in particular due to the fact that the sealing caps arranged on the filter device each have a rotationally symmetrical cantilevered projection, so that the rotational position of the filter can be chosen as desired. This provides for automation. The sealing chamber can be integrated in the vicinity of the sealing head. The sealing compound can uniformly flow radially into the terminal region of the filter device. Furthermore, the sealing chamber can be used repeatedly, as it is not connected with the respective sealing caps only to be used once.

In accordance with another advantageous aspect, the sealing chamber can be used for simultaneously injecting the sealing compound into two filter devices crossed over each other. For this purpose, the sealing chamber then can have four outlet openings.

Instead of two crossed filters, three, four or more filters can be arranged one on top of the other, while they are being sealed. In principle, the filters can be arranged at any angle with respect to each other. For reasons of symmetry, and to avoid imbalances during the rotation, it is recommended to arrange two superimposed filters at an angle of 90° with respect to each other. In the case of three filters, the angle can be 60°, in the case of four filters 45°, etc. In the case of filters arranged parallel to each other, any number of filters can be sealed.

Furthermore, the sealing chamber can be coupled to a running centrifuge by means of an electric synchronization, before the sealing compound is injected.

The invention also relates to an apparatus for introducing a sealing compound into a filter device with flow spaces, a first space of which is formed by the tubular passages of the fibers of a bundle of hollow fibers and a second space of which is formed by a housing enclosing the bundle of hollow fibers, the end portions of the fibers being encapsulated. In accordance with the invention, this apparatus has sealing caps which can be plugged onto the ends of the housing, a cantilevered rotationally symmetrical projection protruding beyond the housing wall. Furthermore, there is each provided a horizontally aligned sealing chamber, whose outlet openings are directed towards the rotationally symmetrical projection of the sealing caps.

In the sealing cap, slots are advantageously provided, which constitute a connection with the interior of the housing via slots or openings provided at the end of the housing. Through this connection, the sealing compound flows into the respective terminal regions of the apparatus.

Between the respective outlet opening of the sealing chamber and the rotationally symmetrical projection, a gap-shaped clearance can be left.

Particularly advantageously, two superimposed crossed filter devices are held by the holding device. In this way, a simultaneous filling of two filter devices can be performed in a compact form.

Finally, the invention relates to a sealing cap for an apparatus as mentioned above, comprising a rotationally symmetrical cantilevered projection. In the region which is surrounded by the collar-shaped projection, slots are uniformly distributed around the periphery.

BRIEF DESCRIPTION OF THE DRAWINGS

Further details and advantages of the present invention will be explained in detail with reference to an embodiment illustrated in the drawing figures, in which:

FIG. 2: shows an enlarged sectional representation in accordance with FIG. 1, an end cap also being mounted on the sealing cap, FIG. 3: shows a sectional representation of an apparatus for introducing a sealing compound into a filter device, FIG. 4: shows the representation of FIG. 3 in a top view, FIG. 5: shows a perspective representation of the apparatus as shown in FIG. 3, and FIG. 6: shows an alternative arrangement of the filter devices for introducing the sealing compound.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

Figure 1:
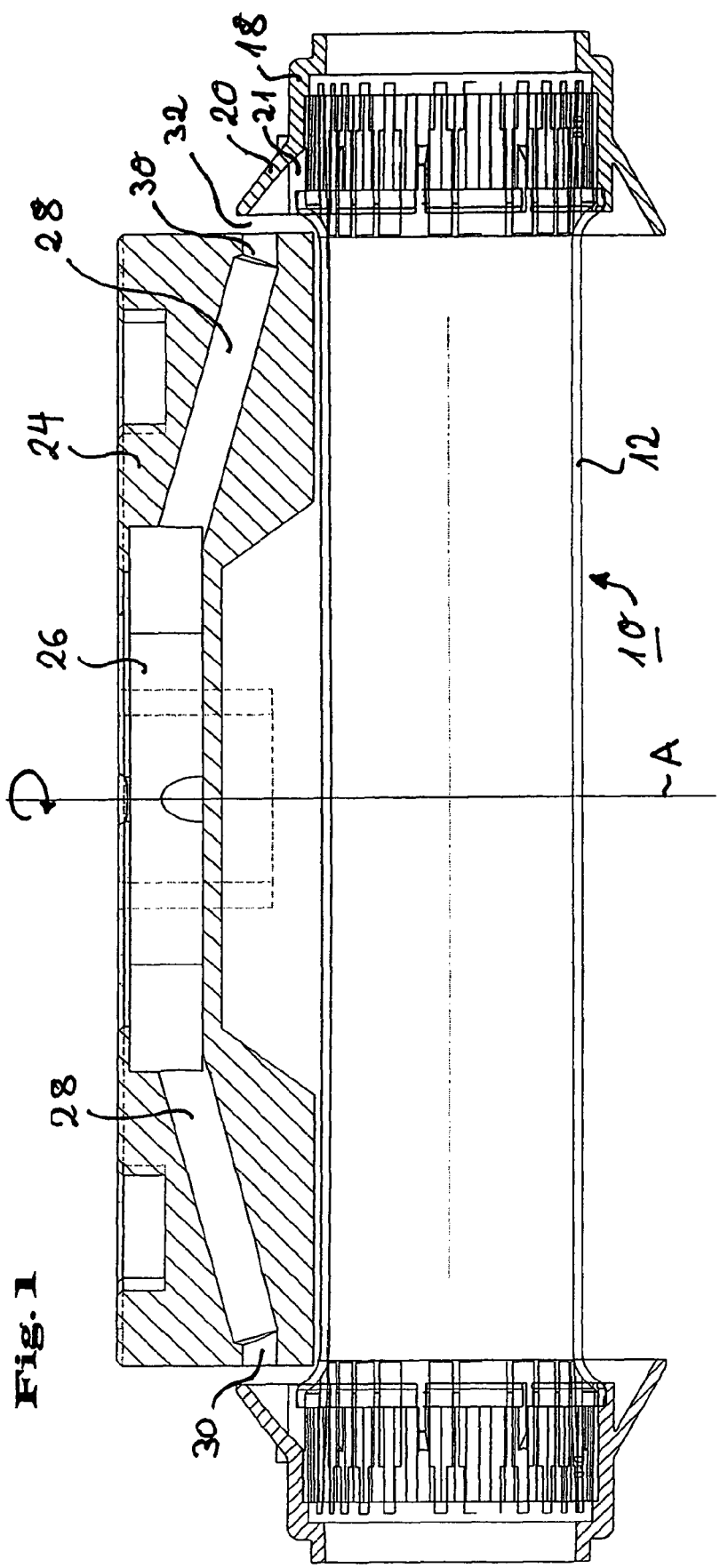
FIG. 1: shows a schematic longitudinal section through the housing of a filter device with attached sealing caps and attached sealing chamber in accordance with the present invention.

FIG. 1 shows a filter device 10, in which for reasons of simplification only the housing 12 is shown, which has the shape of an elongated cylinder. In a known way, the housing 12 has tabs 14 at its respective end portions, between which spaces 16 are left (cf. FIG. 2).

For introducing the sealing compound, which advantageously is made of polyurethane, sealing caps 18 are plugged onto the respective ends of the housing 12, which caps each have a rotationally symmetrical cantilevered projection 20 which has a bevelled outer edge, as can in particular be taken from FIG. 2. Below this cantilevered projection 20, the wall of the sealing cap, which is plugged onto the housing 12, has slots 21 uniformly distributed around the periphery. In FIG. 1 and FIG. 2, the slots 21 are illustrated without hatchings. In the illustrated variant, the sealing cap can be closed at its outer end by means of a cap 22.

In FIG. 1, a sealing chamber 24 is shown, which extends substantially horizontally along the housing 12. This sealing chamber has a central recess 26 into which the sealing material is filled. The sealing chamber 24 and the housing 12 are put into a rotary movement around the axis of rotation A. The rotary movement of the sealing chamber 24 is synchronized with the rotary movement of the centrifuge (not shown), which holds the filter housing. The sealing material entering the chamber 26 is delivered via passages 28 to outlet openings 30 in the sealing chamber, where it is discharged and bridges a gap 32 between the sealing chamber 24 and the cantilevered projection 20 of the sealing cap 18. The sealing material is trapped at the inclined projection 20 and, as this inclined projection 20 has a rotationally symmetrical design, is then distributed over the entire periphery of the housing 12. Due to the still acting centrifugal forces, the sealing compound penetrates through the slots in the sealing cap and the spaces 16 in the housing into the interior of the housing, where it is uniformly distributed.

As a result, an automated and uniform distribution of the sealing compound can be effected.

FIGS. 3 to 5 show a special embodiment of the invention. Here, two filter devices 10 are accommodated one on top of the other in a non-illustrated holding device so as to be crossed by forming an angle of 90°. By means of the holding device, the superimposed crossed filter devices 10 are rotated. The sealing chamber 36 is rotated parallel thereto, the rotational speeds being synchronized such that the openings 30 face the cantilevered projections 20 of the sealing caps 18. During this synchronized rotation, the sealing compound is injected into the filter device.

Figure 6:
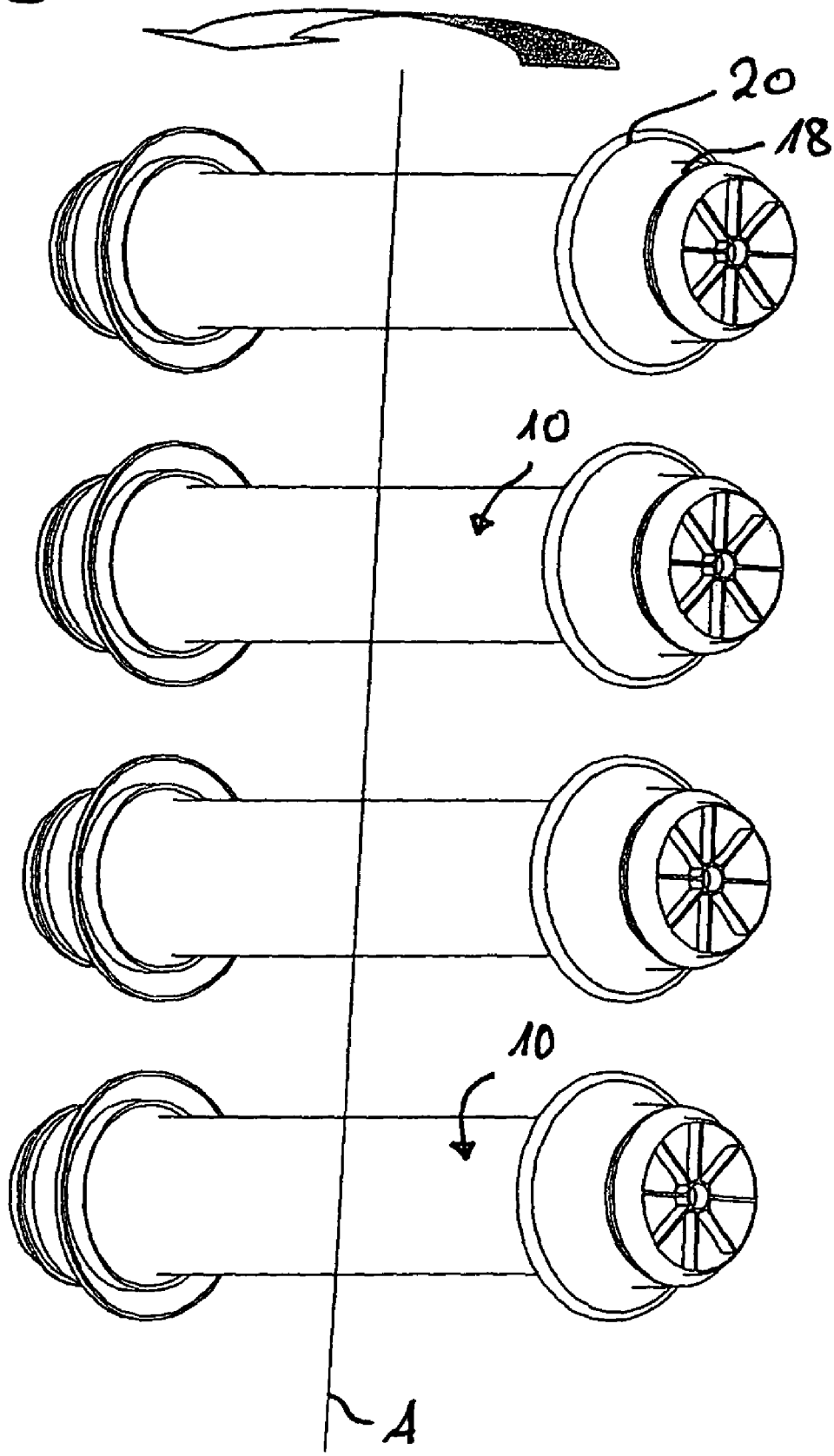

FIG. 6 shows an alternative arrangement of the filter devices 10, while they are filled with sealing compound. For simplification, only those filter devices are shown which are aligned parallel to each other and are jointly rotated around the axis A in the direction of arrow. In this parallel arrangement, any number of filters can be sealed. For this purpose, the non-illustrated sealing chamber is arranged parallel to the filter devices upon synchronization, in order to inject the sealing compound.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for introducing a sealing compound into a filter device with two flow spaces, a first space of which is formed by tubular passages of fibers of a bundle of hollow fibers and a second space of which is formed by a housing enclosing the bundle of hollow fibers, end portions of the fibers being encapsulated in a sealing compound upon sealing, sealing caps being attached for introducing the sealing compound, and the sealing compound being distributed from a sealing chamber via the sealing caps onto the ends of the filter device, said method comprising:

introducing the sealing compound from the sealing chamber into a cantilevered projection of each of the sealing caps, the cantilevered projection being rotationally symmetrical with respect to an axis of rotation of the housing.

2. The method as claimed in claim 1, wherein the sealing compound penetrates into the housing via slots in each of the sealing caps.

3. The method as claimed in claim 1, wherein the sealing chamber and the filter device are rotated, so that the sealing compound is injected by action of centrifugal force.

4. The method as claimed in claim 1, wherein the sealing compound is injected by overcoming a gap between the sealing chamber and the sealing cap.

5. The method as claimed in claim 1, wherein the sealing chamber is configured for simultaneously injecting the sealing compound in at least two superimposed filter devices.

6. The method according to claim 5, wherein the sealing chamber is configured for simultaneously injecting the sealing compound in at least two superimposed and crossed filter devices.

7. The method as claimed in claim 1, wherein, before the sealing compound is injected, the sealing chamber is coupled to a running centrifuge by an electric synchronization.

8. An apparatus for introducing a sealing compound into a filter device with two flow spaces, a first space of which is formed by tubular passages of fibers of a bundle of hollow fibers and a second space of which is formed by a housing enclosing the bundle of hollow fibers, said apparatus comprising:

sealing caps attachable to ends of the housing, with each of the sealing caps including a cantilevered projection protruding beyond a housing wall of the housing, the cantilevered projection being rotationally symmetrical with respect to an axis of rotation of the housing, and a horizontally aligned sealing chamber, whose outlet openings are directed towards the rotationally symmetrical cantilevered projection of the sealing caps.

9. The apparatus as claimed in claim 8, wherein the sealing caps includes slots, which create a connection with an interior of the housing.

10. The apparatus as claimed in claim 9, wherein a gap-shaped clearance is provided between a respective outlet opening of the sealing chamber and the rotationally symmetrical cantilevered projection.

11. The apparatus as claimed in claim 8, wherein the apparatus accommodates at least two superimposed filter devices, and the sealing chamber has at least four outlet openings.

12. The apparatus according to claim 11, wherein the apparatus accommodates at least two superimposed and crossed filter devices, and the sealing chamber has at least four outlet openings.

13. A sealing cap for an apparatus as claimed in claim 8, wherein the sealing cap includes the rotationally symmetrical cantilevered projection.

14. The sealing cap for an apparatus as claimed in claim 13, further comprising slots uniformly distributed around a periphery of the sealing cap, which are arranged in a region which is surrounded by a collar-shaped projection.

* * * * *